United States Patent [19]
Frese et al.

[11] 3,981,849
[45] Sept. 21, 1976

[54] LOW PRESSURE PROCESS FOR THE PRODUCTION OF LOW DENSITY CO- AND TERPOLYMERS OF ETHYLENE

[75] Inventors: Albert Frese; Fritz Baxmann; Walter Dittmann, all of Marl, Germany

[73] Assignee: Chemische Werke Huls Aktiengesellschaft, Marl, Germany

[22] Filed: Oct. 2, 1974

[21] Appl. No.: 511,130

[30] Foreign Application Priority Data
Oct. 5, 1973 Germany............................ 2350065

[52] U.S. Cl................................. 526/82; 526/155; 526/157; 526/160; 526/169; 526/350
[51] Int. Cl.²................. C08F 10/02; C08F 10/06; C08F 10/08
[58] Field of Search................... 260/80.78, 88.2 R

[56] References Cited
FOREIGN PATENTS OR APPLICATIONS
| 7,058 | 4/1965 | Japan |
| 932,658 | 7/1963 | United Kingdom |
| 967,788 | 8/1964 | United Kingdom |

*Primary Examiner*—Alan Holler
*Attorney, Agent, or Firm*—Millen, Raptes & White

[57] ABSTRACT

High molecular weight, low density copolymers of ethylene and propylene and/or butene-1 are prepared by a low pressure liquid phase polymerization process using a titanium halide - organoaluminum catalyst in a polymerization solvent containing butene-2. Consistently comparable ethylene copolymers can be obtained from monomer mixtures of varying composition.

12 Claims, No Drawings

LOW PRESSURE PROCESS FOR THE PRODUCTION OF LOW DENSITY CO- AND TERPOLYMERS OF ETHYLENE

BACKGROUND OF THE INVENTION

This invention relates to a process for the preparation of ethylene copolymers. More particularly, this invention relates to a process for the low-pressure production of high-molecular weight, low density copolymers of ethylene by the copolymerization of ethylene with propylene and/or butene-1 using mixed catalysts of titanium trichloride and a trialkyl-aluminum or dialkyl-aluminum hydride compound in the liquid phase.

Polyethylenes (both homopolymers and copolymers with α-olefins) having high molecular weights are required for various applications, e.g., in the manufacture of loom pickers and other highly stressed parts in the textile industry, in machinery construction, and in the chemical industry, e.g., for feeding screws, gear wheels, runners, valves and slides. Using the Ziegler polymerization process, it is possible to manufacture high-molecular weight types of polyethylene with RSV values of about 17 (measured in a 0.03% solution in decahydronaphthalene at 135°C., Ostwald-type viscosimeter), which corresponds to a molecular weight of about 1 million, calculated in accordance with the solution viscosity $$\lg \overline{M} = \frac{\lg [RSV] - \lg 3.26 \cdot 10^4}{0.77},$$

see Wesslau, Kunstsoffe 49, page 320 (1959). These products exhibit a density of 0.94.

High-molecular weight types of polyethylene, i.e., having RSV values as defined above of 1.5 or higher, with a lower density, i.e., of 0.930 or lower, only recently have been described. Although it is possible using the high-pressure method to produce low density polyethylene having densities of 0.915 – 0.935, these polymers have molecular weights of only up to about 50,000, calculated according to the solution viscosity.

Polyethylene types of low density are required for various fields of application, e.g., extrusion blow molding to obtain hollow articles and films, for coatings, for flame spraying, and for rotational sintering. The types of polyethylene produced according to the high-pressure method, with a density range of 0.915 – 0.935 g/cm³, have the disadvantage that their molecular weights are too low for many applications. In accordance with the low-pressure method, it is difficult or even impossible to set low densities. Thus, according to the low-pressure polymerization processes of Ziegler and Phillips, polyethylenes are obtained having a density of 0.94 – 0.965 g./cm³.

By copolymerization with other olefins, such as propene and butene-1, it is also possible to produce copolymers having a density of 0.930 – 0.950 according to the low-pressure method. This is accomplished, e.g., pursuant to the teachings of British Patent No. 944,371, by polymerization in inert diluents such as butane, pentane, hexane, cyclohexane, isopropylcylohexane, benezene or mixtures of hydrocarbons with the aid of mixed catalysts of halogen-orthotitanic acid esters and organo-metallic compounds of aluminum, in the presence of 0.05 – 20% by volume of propylene and/or butene-1, based on the ethylene. However, in this process, a considerable excess of propene or butene-1 is required in order to obtain copolymers having a butene-1 content of 2–3%. For example, at a polymerization pressure of 3 atmospheres gauge, using hexane as the diluent, 8% of butene-1 is required in the mixture of monomers in order to obtain a copolymer with 2% of butene-1. When polymerizing at 12 atmospheres gauge in order to obtain a higher polymerization velocity, the addition of 35% of butene-1 is required to produce a copolymer having 2–3% of butene-1. This copolymerization, furthermore, is successful only with the use of high-percentage 94–99% purity butene-1. With the utilization of 50% strength butene-1 at 12 atmospheres gauge in hexane as the diluent, it is impossible to manufacture a copolymer with 2–3% of butene-1. Besides, this polyethylene obtained with 50% strength-butene-1 is, with 1.0 – 1.5% butene-1, so fine-grained that it cannot be separated by means of decantation. With the polymerization pressures of 20 atmospheres gauge and thereabove, nowadays customary, it is impossible even when using 95–99% strength butene-1 to obtain a copolymer with 2% of butene-1. Similar difficulties are also encountered in the production of ethylene-butene-propylene terpolymers and ethylene-propylene copolymers.

British Pat. No. 932,658 describes copolymers of ethylene with 2-olefins. In the examples, butene-2 is primarily empolyed. The mixed catalysts consist of organometallic compounds of metals of Group Ia, II, or IIIa and transition metal compounds, e.g., Ti-, V-, or Cr-halides, V- or Cr-acetylacetonates or V-haloalcoholates. These catalysts are preferably present in colloidal distribution, in finely divided form, or in a complete solution. Crystalline copolymers and completely amorphous copolymers are produced but the yields are extremely poor. Such a process is uninteresting from a technical viewpoint, since the yields, in part, are even lower than the amounts of catalyst used, e.g., in Example 13 which uses a TiCl₃ and Al(C₂H₅)₃ catalyst. In the remaining examples, vanadium catalysts are used.

The process described in British Pat. No. 967,788 likewise results in very poor yields. The same catalysts are used as in British Pat. No. 932,658, and co- and/or terpolymers or ethylene with 1-olefins and 2-olefins are produced.

According to the processes disclosed in German Patent Application Nos. P 22 06 429.5 and P 22 14 271.8, corresponding to copending, commonly assigned U.S. Pat. application Ser. No. 332,035, filed Feb. 12, 1973, not pertaining to the state of the art, some of the aforementioned difficulties can be overcome if polymerization is carried out in a $C_4$ or $C_3$–$C_4$ solvent containing propylene and/or butene-1 monomers and at least 10 molar percent of butene-2. The catalysts utilized in these processes are mixed catalysts containing halogen orthotitanic acid esters and/or titanium trichloride and chlorine-containing organoaluminum compounds. According to these patent applications, activation with trialkyl aluminum compounds or dialkyl aluminum hydrides is unsuitable, since this causes the formation of mixtures of the individual homopolymers in addition to co- and terpolymers.

U.S. Pat. No. 2,956,989 teaches that a butene-2-containing solvent is entirely unsuitable for the production of copolymers of ethylene with a catalyst of titanium trichloride and alkyl aluminum compounds, since the butene-2 is polymerized to polybutene-2. Further work done by R. O. Symcox and reported in J. Polymer Sci., Part B, 2 (10):947–949 (1964) established that the product is not polybutene-2, but polybutene-1 since the butene-2 is isomerized to butene-1 under the effect of Ziegler-Natta catalysts, and this butene-1 is then polymerized to polybutene-1. The research done by Symcox is confirmed by further publications, e.g., T. Otsu in J. Polymer Sci., Part A 4 (6):1579–1593 (1966); Masao Iwamoto and Sadao Yuguchi (Bull. Chem. Soc. Japan 40:159–162 (1967); German Unexamined Laid-Open Application DOS No. 1,545,042; and French Patent No. 1,415,239. According to these numerous publications, a butene-2-containing solvent is completely infeasible for the production of ethylene copolymers with Ziegler-Natta catalysts, since in addition to the ethylene copolymers also larger amounts of polybutene-1 are bound to be formed.

OBJECTS OF THE INVENTION

Accordingly, it is an object of this invention to provide a process for preparing low density copolymers of ethylene and one or more α-olefins.

Another object of this invention is to provide a low-pressure process for preparing low density ethylene copolymers.

A further object of this invention is to provide a low pressure process for preparing ethylene copolymers of high molecular weight and low density.

An additional object of this invention is to provide a process for preparing ethylene copolymers having a broad molecular weight distribution.

Yet another object of this invention is to provide a process for reproducibly obtaining consistently comparable ethylene copolymer products from monomer mixtures of varying compositions.

Still another object of this invention is to provide a process for preparing a wide range of ethylene copolymers from a given monomer mixture composition.

Upon further study of the specification and appended claims, further objects and advantages of this invention will become apparent to those skilled in the art.

SUMMARY OF THE INVENTION

Briefly, the above and other objects are attained in one aspect of this invention by providing a process for the production of low density thermoplastic ethylene copolymers by a low pressure copolymerization of ethylene with a α-olefin comonomer selected from the group consisting of propylene, butene-1 and mixtures thereof, which comprises the combination of employing a mixed polymerization catalyst consisting essentially of (a) titanium trichloride and (b) a trialkylaluminum or a dialkylaluminum hydride in a molar ratio Al:Ti of 0.5 – 4, and conducting the polymerization as a liquid phase solution polymerization employing a polymerization solvent consisting essentially of $C_4$ or a mixture of $C_3$ and $C_4$ hydrocarbons containing at least 20 molar percent of butene-2.

DETAILED DISCUSSION

It could not be foreseen that it is possible to produce, in a diluent containing butene-2, ethylene copolymers extensively free of polybutene-1 homopolymers. In accordance with the present invention, this problem is solved by conducting the co- or terpolymerization, respectively, with the aid of a mixed catalyst of titanium trichloride, on the one hand, and trialkylaluminum compounds and/or dialkylaluminum hydrides, on the other hand, in a solvent containing 0.1 to 20 molar percent of butene-1 and/or propene comonomer, butane and/or propane, and butene-2.

In this connection, is is surprisingly advantageous that it is possible to obtain a co- and terpolymer extensively free of homopolymers even in the activation with trialkylaluminum compounds and/or dialkylaluminum hydrides. With a butene-1 content of up to 10 molar percent in the solvent, no homopolymers can be detected at polymerization temperatures of up to 80°C. in the co- and/or terpolymer. As compared to the mixed catalysts with chlorine-containing organoaluminum compounds, the mixed catalysts containing trialkylaluminum compounds and/or dialkylaluminum hydrides have the further advantage of a substantially higher polymerization activity. The thus-obtained copolymers also have a considerably higher proportion of methyl groups, due essentially to a broader molecular weight distribution.

Finally, the co- and terpolymers obtained according to this invention differ over the products produced according to the processes of German Patent Application Nos. P 22 06 429.5 and P 22 14 271.8 by a broader molecular weight distribution, e.g., with a molecular nonuniformity (Mw/Mn - 1) of 6 to 20. These co- and terpolymers with a broad molecular weight distribution can, therefore, be processed very satisfactorily. In particular, they can be processed into hollow articles free of melt fractures and with a very smooth surface.

The polymerization is conducted, according to this invention, in a solvent containing, in addition to 0.1 to 20 molar percent of butene-1 and/or propene monomer, 1–60 molar percent of butane and/or propane, on the one hand, and 20–98.9 molar percent of butene-2, on the other hand.

Suitable as the butane in n- and isobutane, as well as any mixture of these substances. The butene-2 can be present in the cis-or trans-configuration, or in any desired mixture thereof. In place of the butene-1, is is also possible to employ a mixture of butene-1 and minor amounts of isobutene. In such a butene-1/isobutene mixture, the isobutene proportion should not be above 10 5, based on the butene-1/isobutene mixture. The mixture ratios of propane/butane: butene-2 are arbitrary within a proportion of about 1–85 mol-% of butane and/or propane and correspondingly 15–99 mol-% of butene-2.

It has furthermore surprisingly been found that the maximum proportion of propylene and/or butene-1 which can be present in the total solvent mixture of this invention is inversely dependent on the polymerization temperature.

At a polymerization temperature of about 100°C., this proportion is not to exceed 4 molar percent, wherein the propylene proportion is not to rise above 3% and the butene-1 proportion is not to exceed 5%.

The butene-1 content in the hydrocarbon mixture at polymerization temperatures of about 100°C., is preferably 0.1 – 5%, especially 0.3 – 2.5%, and the propene is present preferably in an amount of 0.1 – 3%, especially 0.2 – 2%.

At polymerization temperatures of about 70°C., the butene-1 content in the hydrocarbon mixture is preferably 0.1 – 10%, especially 0.5 – 5 mol-%, and the propene content is preferably 0.1 – 5%, especially 0.2 – 2.5 mol-%.

With polymerization temperatures of about 50°C., the butene-1 content in the hydrocarbon mixture can be 0.1 – 20%, particularly 0.5 – 10 mol-%, and the propene preferably 0.1 – 15%, especially 0.3 – 7.5 mol-%.

The corresponding proportions for butane and/or propene or butene-2 are 1 – 85 mol-%, preferably 5 – 45 mol-%, particularly 10 – 40 mol-% of butane and/or propane and correspondingly 20 – 98.9 mol-%, preferably 55 – 95 mol-%, especially 60 – 90 mol-% of butene-2.

Thus, as the polymerization is conducted at lower temperatures, e.g., of 100°, 70°, 50° and 20°C., the maximum proportion of propylene employed can be increased from 3% up to 5%, 15%, and 30 molar percent, respectively. Similarly, the maximum butene-1 proportion employed can be increased from 55 to 10%, 20% and 40 molar percent, respectively. The maximum amount of combined propylene and/or butene-1 present in the solvent mixture is not greater than 4 molar percent at a polymerization temperature of about 100°C., but can be increased to 7, 10, and 20% at decreasing polymerization temperatures of 70°, 50° and 20°C., respectively.

This realization is surprising, as well as valuable, and provides a large number of possibilities for variation; for example, it is now possible, starting from gaseous monomer mixtures of varying composition, to obtain consistently comparable polymers. It is likewise possible, starting from a single gaseous monomer mixture, to modify the polymer properties within broader limits than heretofore possible.

The novel process makes it possible to produce polyethylene co- and terpolymers with a density of about 0.90 to about 0.96 g/cm$^3$, preferably 0.925 to 0.955, and molecular weights of about 40,000 to about 4,000,000 preferably of about 60,000 to about 1,000,000 calculated in accordance with the solution viscosity. Thus, types of polyethylene are obtained which could not heretofore be produced by the known prior art processes, whether low- or medium-pressure processes.

Furthermore, as compared to older processes for the preparation of ethene - butene-1 copolymers, such as British Pat. No. 944,371, it is surprising that in certain cases only a very minor proportion, e.g., as little as or even 0.1 % of butene-1 and/or propene is required for the production of the ethylene co- and/or terpolymers.

It is surprising that, according to this invention, a very minor butene-1 and/or propene proportion is now required for the production of the ethylene co- and terpolymers; the butene-1 and propene present in the C$_3$–C$_4$ hydrocarbon mixtures is copolymerized to about 40 to 98%. An additional advantage is that it is possible to use, in place of the expensive, high-purity butene-1, considerably less costly C$_4$- or C$_3$/C$_4$- hydrocarbon mixtures. These low-boiling hydrocarbon mixtures have the additional advantage over the higher-boiling hydrocarbons in that they effect a better removal of the heat of polymerization by evaporative cooling at higher pressures, and that the thus-obtained polymer can be dried considerably more simply, gently and more rapidly.

A highly suitable C$_4$- hydrocarbon mixture contains, for example, 30–60% butane, 25–50% trans-butene-2, 10–30% cisbutene-2, 0.1–30% butene-1 and 0.01–25 isobutene. Suitable are, for example, the distillation residues obtained during the butene-1 concentration process. Furthermore, C$_3$–C$_4$- fractions can likewise be employed, e.g., containing about 20% propane, 3% propene, 30% butane, 42% butene-2 and 5% butene-1. Surprisingly, the proportion of butene-1 and/or propene causes a considerable increase in catalyst activity, as can be seen from Example 7.

As the titanium trichloride, a crystalline titanium trichloride is preferably utilized, e.g., $\alpha$-, $\gamma$-, or $\delta$-titanium trichloride. These can be obtained, for instance, by the reduction of titanium tetrachloride with metallic aluminum or with organoaluminum compounds. This titanium trichloride has the composition TiCl$_3$ · n AlCl$_3$ ($n = 0.2 – 0.6$).

Suitable alkylaluminum compounds include but are not limited to triethylaluminum, tripropylaluminum, tri-n-butylaluminum, triisobutylaluminum, diisobutyl aluminum hydride, etc.

The mixed catalysts obtained from both components are preferably used in a molar ratio of Al:Ti of 0.5 – 4, particularly 1 – 3. Suitably, a concentration of 0.01 – 2 millimoles per liter is maintained. The catalyst concentration required is dependent on the polymerization pressure and the impurities interfering with the polymerization. During continuous polymerization, both catalyst components are added simultaneously, preferably separately. During discontinuous polymerization, the alkylaluminum compound is preferably added first. A preliminary aging step is generally unnecessary.

The polymerization is conducted at temperatures of 20°–100°C., preferably 50°–80°C., advantageously under pressures of 10–50 atm. gauge, particularly 20–40 atm. gauge, in order to maintain the liquid phase. In order to terminate polymerization, the catalyst can be decomposed by adding water or alcohol; in case of very low catalyst concentrations, it is also possible to omit the catalyst decomposition step. With the minor catalyst concentrations, the processing of the product can be limited to a simple spraying step through nozzles. The use of C$_4$- or C$_3$/C$_4$- hydrocarbons is especially advantageous for this processing method.

Surprisingly, the formation of mixtures of homopolymers to be expected according to German Patent Application No. P 22 06 429.5 can be extensively prevented by providing that, at polymerization temperatures of up to 100°C., 0.1 – 5%, especially 2.5 mol-% of butene-1 and/or 0.1 – 3%, particularly about 2 mol-% of propene are present in the hydrocarbon mixture. At polymerization temperatures of up to 70°C., the hydrocarbon mixture can contain up to 10 mol-%, especially up to 5 mol-% of butene-1, and/or up to 5%, particularly up to 2.5 mol-%, of propene. At polymerization temperatures of up to 50°C., these quantities are up to 20 mol-%, especially up to 10 mol-% of butene-1 and/or up to 15 mol-%, especially up to 7.5 mol-%, of propene.

In the following examples, the physical properties set forth were determined according to standard testing techniques. Relative Solution Viscosity (RSV) was determined in an Ostwald-type viscosimeter. Viscosity average molecular weight was measured according to $$\lg \overline{M}v = \frac{\lg /RSV/ - \lg 3.26 \cdot 10^{-4}}{0.77}$$

Weight average ($\overline{M}_w$) molecular weights were obtained from gel chromatography measurements according to J. C. Moore, J. Poly. Sci. A 2:835 (1964). Number average ($\overline{M}_n$) molecular weights were obtained from dispersion methods.

Melt flow values (MF) are calculated form DIN 53 735. Yield stress and yield stress elongation were determined according to DIN 53 455, ruptural strength and ruptural strength elongation were measured by DIN 53 455, while tensile impact strength was determined according to DIN 53 448. IR analysis was conducted with an NaCl prism spectometer (Perkin Elmer M21).

The term "polyethylene" as applied to the products of the examples refers to the resultant copolymers having many of the characteristic physical properties of low density polyethylene.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following Examples, the temperatures are set forth uncorrected in degrees Celsius; unless otherwise indicated, all parts and percentages are by weight.

EXAMPLE 1

A. A reactor having a capacity of 50 liters and 50 atmospheres gauge is charged with 12 parts by weight of a butene-butane mixture containing 39.5% trans-butene-2, 19.8% cis-butene-2, 40.2% n-butane and 0.5% butene-1. Under agitation, 0.0034 part by weight of triethylaluminum, and 0.0023 part by weight of titanium trichloride ($TiCl_3 \cdot 0.3\ AlCl_3$, commercial titanium trichloride) and 0.002 part by weight of hydrogen are added at 80°C. to this charge. Thereafter, 5 parts by weight of ethylene is introduced within one hour under a pressure of up to 34 atm. gauge. The average polymerization pressure is 20 atm. gauge. After a polymerization time of one hour, the pressure had dropped to 14 atm. gauge. The thus-obtained polyethylene suspension is passed through nozzles into a second vessel after adding 0.1 part by weight of water. After drying, 4.1 parts by weight of an ethylene-butene-1 copolymer is produced having the following characteristic values:

| | |
|---|---|
| RSV | 3.4 dl./g., Mv: 143,000 |
| MI [Melt Index]$_{190/5}$ | 0.9 g./10 min. |
| Density | 0.944 g./cm$^3$ |
| Bulk density | 316 g./l |
| Yield stress | 194 kp/cm$^2$ |
| Elongation at yield point | 17% |
| Break tensile strength | 289 kp./cm$^2$ |
| Elongation at rupture | 784% |
| Tensile impact strength | 628 kp.cm/cm$^2$ |
| Molecular nonuniformity | ($U = \frac{M_w}{M_n} - 1$) =9.95 |
| <Mw/5 | 41.1% |
| Mw/5 to Mw | 36.4% |
| >Mw | 22.5% |

IR Analysis: Double bonds/1000 C:

| | |
|---|---|
| trans | 0.04 |
| vinyl | 0.05 |
| vinylidene | <0.02 |
| CH$_3$/100 C | 1.93 |

B. Repeating the procedure of Experiment 1(A) but without adding hydrogen, an ethene-butene-1 copolymer is obtained having the following characteristic data:

| | | |
|---|---|---|
| RSV | 10.3 dl./g | Mv: about 650,000 |
| MI$_{190/5}$ | <0.1 g./10 min. | |
| Density | 0.939 g./cm$^3$ | |
| Yield stress | 158 kp./cm$^2$ | |
| Elongation at yield point | 17% | |
| Break tensile strength | 340 kp./cm$^2$ | |
| Elongation at rupture | 441% | |

IR Analysis: Double bonds/1000 C:

| | |
|---|---|
| trans | 0.06 |
| vinyl | 0.05 |
| vinylidene | <0.02 |
| CH$_3$/100 C | 1.22 |

C. Repeating the procedure of Experiment 1(A) but varying the amount of hydrogen used to (a) 0.003; (b) 0.0035; and (c) 0.004 part by weight of hydrogen, ethene-butene-1 copolymers are obtained having the following characteristics:

| | a | b | c |
|---|---|---|---|
| RSV  dl./g. | 2.6 | 2.4 | 2.2 |
| Mv: | 106,000 | 96,000 | 87,000 |
| MI$_{190/5}$ g./10 min. | 1.4 | 2.6 | 6.9 |
| Density g./cm$^3$ | 0.953 | 0.955 | 0.946 |
| Bulk density g./l. | 300 | 336 | 305 |
| Yield stress kp./cm$^2$ | 250 | 257 | 236 |
| Elongation at yield point % | 17 | 17 | 17 |
| Break tensile strength kp./cm$^2$ | 356 | 321 | 254 |
| Elongation at rupture % | 834 | 706 | 817 |
| IR Analysis: | | | |
| Double bonds/1000 C | | | |
| trans | 0.04 | 0.04 | 0.06 |
| vinyl | 0.04 | 0.05 | 0.05 |
| vinylidene | <0.02 | <0.02 | <0.02 |
| CH$_3$/100 C | 1.01 | 1.34 | 1.71 |
| Molecular nonuniformity | | | |
| $U = \frac{M_w}{M_n} - 1$ | | | 6.48 |
| <Mw/5 | | | 36.3 |
| Mw/5 to Mw | | | 41.0 |
| >Mw | | | 22.7 |

D. When equimolar amounts of tripropylaluminum or triisobutyl aluminum are utilized in place of triethylaluminum, comparable polymers are obtained.

EXAMPLE 2

A. An agitator-equipped vessel having a capacity of 50 liters and 50 atmospheres gauge is charged with 15 parts by weight of a butene-butane mixture containing 39.7% butane, 32.6% trans-butene-2, 17.7% cis-butene-2, 9.8% butene-1 and 0.2% isobutene. At a temperature of 80°C., 0.0034 part by weight of triethylaluminum, 0.0023 part by weight of titanium trichloride ($TiCl_3 \cdot 0.3\ AlCl_3$) and 0.002 part by weight of hydrogen and added to the mixture. Within 1 hour, 6 parts by weight of ethylene is introduced under pressure, up to a pressure of 38 atmospheres gauge. The average polymerization pressure is 20 atm. gauge. After a polymerization time of 2 hours, the pressure has dropped to 12 atm. gauge. The thus-produced polyethylene suspension is passed through nozzles into a second vessel while adding steam, thus obtaining 5.4 parts by weight of an ethylene-butene-1 copolymer having the following properties:

| RSV | 2.3 dl./g. | Mv: about |
| --- | --- | --- |
| MI$_{190/5}$ | 8.6 g./10 min. | 90,000 |
| Density | 0.927 g./cm$^3$ | |
| Yield stress | 121 kp./cm$^2$ | |
| Elongation at yield point | 23% | |
| Break tensile strength | 127 kp./cm$^2$ | |
| Elongation at rupture | 552% | |
| IR Analysis: Double bonds/1000 C: | | |
| trans | 0.08 | |
| vinyl | 0.14 | |
| vinylidene | 0.03 | |
| CH$_3$/100 C | 6.4 | |

B. By conducting the polymerization according to Example 2(A) but with 0.0059 part by weight of tri-n-butylaluminum instead of 0.0034 part by weight of triethylaluminum, a comparable ethene-butene-1 copolymer is obtained.

C. When conducting the polymerization according to the description of this example but at 60°C. instead of at 80°C., an ethene-butene-1 copolymer is produced having the following characteristic values;

| RSV | 3.6 dl./g. |
| --- | --- |
| MI$_{190.5}$ | <0.1 g./10 min. |
| Density | 0.928 g./cm$^3$ |
| Yield stress | 133 kp./cm$^2$ |
| Break tensile strength | 300 kp./cm$^2$ |
| Elongation at rupture | 757% |
| IR Analysis: Double bonds/1000 C: | |
| trans | 0.03 |
| vinyl | 0.04 |
| vinlidene | 0.03 |
| CH$_3$/100 C | 3.5 |

EXAMPLE 3

A. Into a laboratory autoclave having a capacity of 5 liters, 1.2 parts by weight of a C$_4$-cut is charged containing 38% trans-butene-2, 30.5% cis-butene-2, 30.4% butane, 1.0% butene-1 and 0.1% isobutene. At a temperature of 50°C., 0.00085 part by weight of triethylaluminum, 0.00046 part by weight of commercial titanium trichloride (TiCl$_3$ · 0.3 AlCl$_3$) and 0.0002 part by weight of hydrogen are added to the mixture. Within one hour, 0.5 part by weight of ethylene is introduced up to a pressure of 16 atm. gauge. After a polymerizing time of one hour, the pressure has dropped to 8 atm. gauge.

The unreacted ethylene is then expanded together with the C$_4$-cut as in the previous Examples. After a secondary drying step, 0.41 part by weight of an ethene-butene-1 copolymer is produced with the following characteristics:

| RSV | 2.4 dl./g. | MV: about |
| --- | --- | --- |
| MI$_{190/5}$ | 3.9 g./10 min. | 96,000 |
| Density | 0.947 g. cm$^3$ | |
| Yield stress | 230 kp./cm$^2$ | |
| Elongation at yield point | 18% | |
| Break tensile strength | 377 kp./cm$^2$ | |
| Elongation at rupture | 859% | |

-continued

| IR Analysis: Double bonds/1000 C: | |
| --- | --- |
| trans | 0.03 |
| vinyl | 0.05 |
| vinylidene | 0.02 |
| CH$_3$/100 C | 1.26 |

B. Following the procedure of Example 3A but using a polymerization temperature of 80°C. instead of 50°C., an ethene-butene-1 copolymer is produced having the following characteristic values:

| RSV | 1.6 dl./g. | Mvv: about |
| --- | --- | --- |
| MI$_{190/5}$ | 8.6 g./10 min. | 60,000 |
| Density | 0.934 g./cm$^3$ | |
| Yield stress | 168 kp./cm$^2$ | |
| Elongation at yield point | 19% | |
| Break tensile strength | 163 kp./cm$^2$ | |
| Elongation at rupture | 538% | |
| IR Analysis: Double bonds/1000 C: | | |
| trans | 0.07 | |
| vinyl | 0.06 | |
| vinylidene | 0.03 | |
| CH$_3$/100 C | 2.3 | |

C. Following the procedure of Example 3A, but using a polymerization temperature of 70°C. instead of 50°C. and without the addition of hydrogen, and ethene-butene-1 copolymer is obtained having the following properties:

| RSV | 14.3 dl./g. | Mv: about |
| --- | --- | --- |
| MI$_{190/5}$ | <0.1 g./10 min. | 1,000,000 |
| Density | 0.931 g./cm$^3$ | |
| Yield stress | 158 kp./cm$^2$ | |
| Elongation at yield point | 20% | |
| Break tensile strength | 363 kp./cm$^2$ | |
| Elongation at rupture | 450% | |
| IR Analysis: Double bonds/1000 C: | | |
| trans | <0.02 | |
| vinyl | <0.02 | |
| vinylidene | <0.02 | |
| CH$_3$/100 C | 0.96 | |

EXAMPLE 4 a. Production of a TiCl$_3$ · 0.5 AlCl$_3$ Catalyst

One mole of titanium tetrachloride (100% strength) is added dropwise under agitation within 6 hours to a 20% solution of 1.4 moles ethyl aluminum sesquichloride (molecular weight 123.7) in hexane, cooled to −5°C. After a secondary reaction time of 15 hours at −5°C. to +10°C., the catalyst suspension is tempered for 6 hours at 150°C. Thereafter, the catalyst precipitate is separated and washed twice with butane. In a practically quantitative yield, 1 mole of a titanium trichloride catalyst is obtained, having the composition TiCl$_3$ · 0.52 AlCl$_3$.

b. Polymerization

With the aid of a mixed catalyst from 0.00125 part by weight of this titanium trichloride catalyst and 0.002 part by weight of triethylaluminum, 7 parts by weight of ethylene is polymerized in 15 parts by weight of a C$_4$-cut containing 38.2% trans-butene-2, 30.5% cis-butene-2, 28.6% butane, 2.5% butene-1 and 0.2 isobutene, after adding 0.002 part by weight of hydrogen, at 80°C. and an average pressure of 23 atm. gauge. After a polymerization time of 2 hours, the thus-produced polyethylene suspension is passed through nozzles into a second container. In this way, 6.5 parts by weight of an ethene-butene-1 copolymer is produced having the following characteristic data:

| | | |
|---|---|---|
| RSV | 2.7 dl./g. | Mv: about |
| MI$_{190/5}$ | 1.4 g./10 min. | 112,000 |
| Density | 0.930 g./cm$^3$ | |
| Yield stress | 147 kp./cm$^2$ | |
| Elongation at yield point | 19% | |
| Break tensile strength | 258 kp./cm$^2$ | |
| Elongation at rupture | 594% | |
| Tensile impact strength | 736 kp.cm/cm$^2$ | |
| IR Analysis: | | |
| CH$_3$/100 C | 3.6 | |

C. When using, in place of the C$_4$-cut with 2.5% butene-1, a C$_3$-C$_4$-cut containing 1.5% propene, a comparable ethene-propene copolymer is obtained.

EXAMPLE 5

In a 5-liter laboratory autoclave, 0.00055 part by weight of triethylaluminum, 0.00046 part by weight of a commercial titanium trichloride (TiCl$_3$ · 0.3 AlCl$_3$) and 0.0002 part by weight of hydrogen are added at 75°C. to 1.2 parts by weight of a C$_4$-cut containing 0.2% butene-1. Within 1 hour, 0.8 part by weight of ethylene is introduced up to a pressure of 18 atm. gauge. After expansion of the excess ethylene and of the C$_4$-cut, 0.765 part by weight of an ethene-butene-1 copolymer is produced having the following properties:

| | | |
|---|---|---|
| RSV | 3.6 dl./g. | Mv: about |
| MI$_{190/5}$ | 0.1 g./10 min. | 160,000 |
| Density | 0.947 g./cm$^3$ | |
| Bulk density | 425 g./l. | |
| Yield stress | 232 kp./cm$^2$ | |
| Elongation at yield point | 19% | |
| Break tensile strength | 418 kp./cm$^2$ | |
| Elongation at rupture | 673% | |
| IR Analysis: Double bonds/1000 C: | | |
| trans | <0.02 | |
| vinyl | <0.02 | |
| vinylidene | <0.02 | |
| CH$_3$/100 C | 0.52 | |

With the use of equimolar amounts of diethylaluminum hydride or diisobutylaluminum hydride in place of triethylaluminum, comparable polymers are obtained.

EXAMPLE 6

A 5-liter laboratory autoclave is charged with 1.2 parts by weight of a C$_3$-C$_4$-cut containing 8% propane, 5% propene, 35% trans-butene-2, 29% cis-butene-2, 22.5% butane and 0.5% butene-1. At a temperature of 50°C., 0.00045 part by weight of triethylaluminum, 0.00030 part by weight of commercial titanium trichloride (TiCl$_3$ · 0.3 AlCl$_3$) and 0.0002 part by weight of hydrogen are added thereto. Within 1 hour, 1.2 parts by weight of ethylene is introduced up to a pressure of 18 atm. gauge. After a polymerization time of 1 hour, the pressure has dropped to 8 atm. gauge. The unreacted ethylene is then expanded together with the C$_3$-C$_4$-hydrocarbons. After a secondary drying step, 1.15 parts by weight of an ethenepropene-butene-1 terpolymer is obtained having the following characteristics:

| | | |
|---|---|---|
| RSV | 2.7 dl./g. | Mv: about |
| MI$_{190/5}$ | 0.3 g./10 min. | 110,000 |
| Density | 0.931 g./cm$^3$ | |
| Bulk density | 326 g./l. | |
| Yield stress | 158 kp./cm$^2$ | |
| Elongation at yield point | 23% | |
| Break tensile strength | 294 kp./cm$^2$ | |
| Elongation at rupture | 891% | |

EXAMPLE 7

Into a 5-liter laboratory autoclave is charged 1.2 l. of a C$_3$-C$_4$- or a C$_4$-cut respectively containing the proportions of propene and/or butene-1 indicated in the table. At a temperature of 50°C., 0.00045 part by weight of triethylaluminum, 0.0003 part by weight of titanium trichloride (TiCl$_3$ · 0.3 AlCl$_3$) and 0.0002 part by weight of hydrogen are added to the mixture. Ethylene is introduced up to a pressure of 18 atm. gauge, and this pressure is maintained constant by the further addition of ethylene. After a polymerization time of one hour, the mixture is expanded, and the thus-obtained polymer is subjected to a secondary drying step.

| [Example] | A | B | C | D |
|---|---|---|---|---|
| Butene-1 content, % | 0.5 | 0.5 | 0.5 | 10 |
| Propene content, % | — | 5 | 10 | — |
| Yield, parts by wt. | 0.78 | 1.15 | 1.57 | 1.12 |

The ethene-propene-butene-1 terpolymer obtained according to Example 7C has the following characteristics;

| | | |
|---|---|---|
| RSV | 3.5 dl./g. | Mv: about |
| MI$_{190/5}$ | 0.3 g./10 min. | 150,000 |
| Density | 0.932 g./cm$^3$ | |
| Bulk density | 335 g./l. | |
| Yield stress | 163 kp./cm$^2$ | |
| Elongation at yield point | 23% | |
| Break tensile strength | 206 kp./cm$^2$ | |
| Elongation at rupture | 561% | |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the production of low density thermoplastic ethylene copolymers by low pressure copolymerization of ethylene with 0.1 to 20 molar percent of an α-olefin comonomer selected from the group consisting of propylene, butene-1 and mixtures thereof with a particulate mixed polymerization catalyst consisting essentially of (a) titanium trichloride and (b) a trialkylaluminum or a dialkylaluminum hydride in a molar ratio Al:Ti of 0.5 – 4.0, the improvement which comprises conducting the polymerization as a liquid phase solution polymerization employing a polymerization solvent consisting essentially of $C_4$ or a mixture of $C_3$ and $C_4$ hydrocarbons containing 0.1–20 molar percent of said α-olefin, 1–60 molar percent of butane, propane or mixtures thereof and 20–98.0 molar percent of butene-2 to form said copolymer product substantially free of homopolymers, provided that the maximum amount of butene-1 present in the solvent mixture is not greater than 5 molar percent and the maximum amount of propylene is not greater than 3 molar percent at a polymerization temperature of 70 to 100°C.; the maximum amount of butene-1 present in the solvent mixture is not greater than 10 molar percent and the maximum amount of propylene is not greater than 5 molar percent at a polymerization temperature of 50 to 70°C.; and the maximum amount of butene-1 present in the solvent mixture is not greater than 20 molar percent and the maximum amount of propylene is not greater than 15 molar percent at a polymerization temperature of 20° to 50°C.

2. A process according to claim 1 wherein said solvent consists essentially of, per 100 parts of weight of solvent, 30 – 60 parts propane and/or butane; 25 – 50 parts trans-butene-2, 10 – 30 parts cis-butene-2; 0.1 – 20 parts combined propylene and butene-1; and 0.01 – 2 parts isobutene.

3. A process according to claim 1 wherein said solvent is a C 4 hydrocarbon mixture consisting essentially of, per 100 parts by weight of solvent, 30 – 60 parts butane; 25 – 50 parts trans-butene-2; 10 – 20 parts cis-butene-2; 0.1 – 20 parts butene-1; and 0.01 – 2 parts isobutene.

4. A process according to claim 3 wherein said solvent is the distillation residue obtained from the sump of a butene-1 concentration process.

5. A process according to claim 1 wherein said solvent consists essentially of, per 100 parts by weight of solvent, about 20 parts propane; about 3 parts propylene; about 30 parts butane; about 42 parts butene-2; and about 5 parts butene-1.

6. A process according to claim 1 wherein said solvent contains 0.1 – 20 molar percent butene-1.

7. A process according to claim 1 wherein said solvent contains 0.1 – 15 molar percent propylene.

8. A process according to claim 1, further comprising conducting the polymerization reaction in the presence of a molecular weight regulator.

9. A process according to claim 8, wherein the molecular weight regulator is gaseous hydrogen.

10. A process according to claim 1 further comprising adiabatically expanding unreacted monomers and residual solvent at the completion of the polymerization reaction.

11. A process according to claim 1 wherein said catalyst component (b) is selected from the group consisting of triethylaluminum, tripropylaluminum, tri-n-butylaluminum, triisobutylaluminum and diisolbutylaluminum hydride.

12. A process according to claim 11 wherein said catalyst component (a) is a crystalline titanium trichloride of the formula $TiCl_3 \cdot n\ AlCl_3$ wherein $n = 0.2 - 0.6$.

* * * * *